Figure 5:
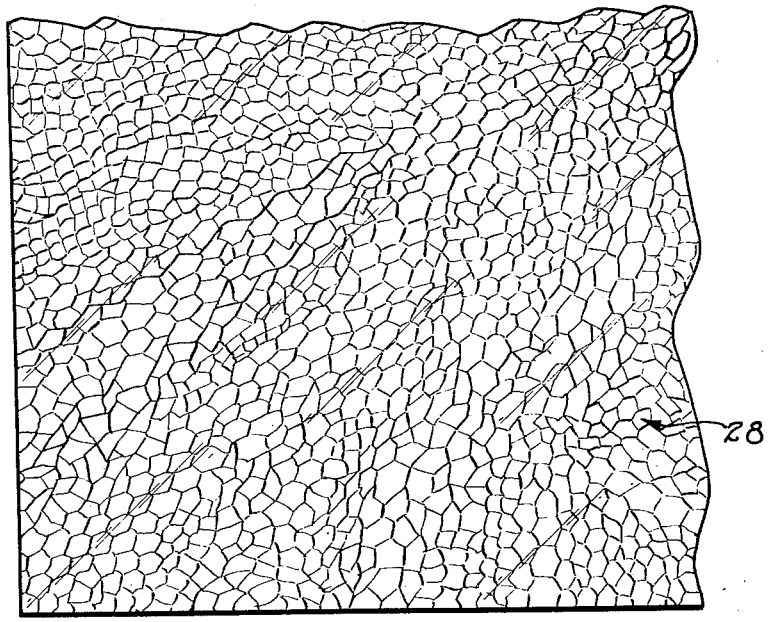

Aug. 22, 1933.   W. J. BELKNAP   1,923,070
SAFETY GLASS
Filed Dec. 16, 1931   2 Sheets-Sheet 1
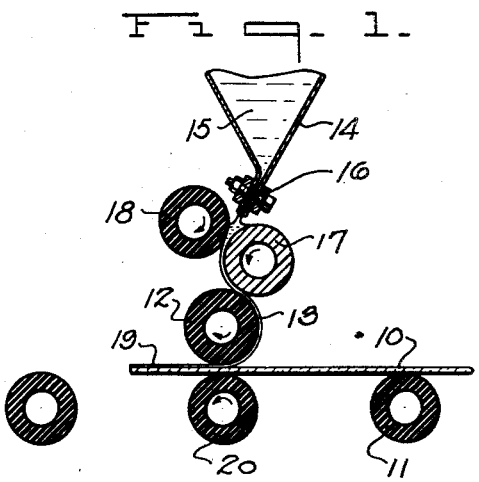
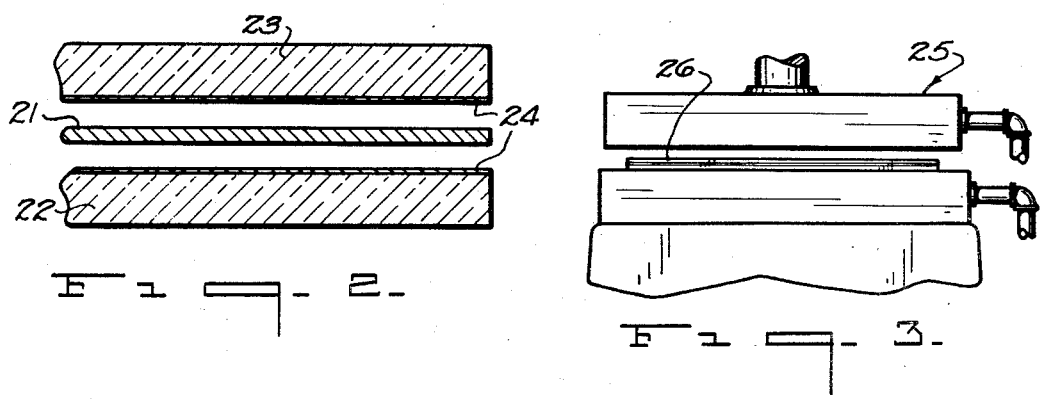
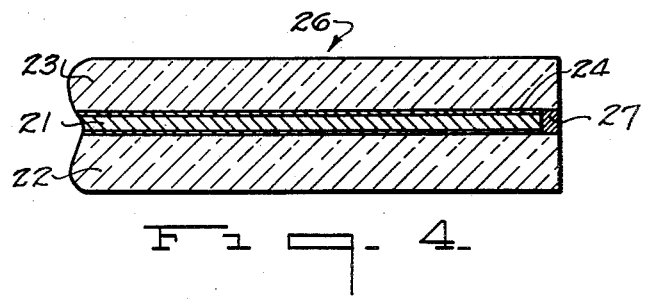
Inventor
William J. Belknap.
By Frank Fraser
Attorney Aug. 22, 1933.  W. J. BELKNAP  1,923,070
SAFETY GLASS
Filed Dec. 16, 1931   2 Sheets-Sheet 2

Inventor
William J. Belknap
By Frank Fraser
Attorney

Patented Aug. 22, 1933

1,923,070

UNITED STATES PATENT OFFICE 1,923,070

SAFETY GLASS

William J. Belknap, Detroit, Mich., assignor to Libbey-Owens-Ford Glass Company, Toledo, Ohio, a Corporation of Ohio Application December 16, 1931
Serial No. 581,365

9 Claims. (Cl. 49—81)

The present invention relates to composite safety glass and also to the process of producing the same.

Safety glass, as known today, ordinarily comprises two sheets of ordinary plate or window glass between which is arranged a layer of plastic material, such as a cellulose ester, which is bonded to the glass sheets. As is well known, if a single sheet of ordinary plate or window glass is broken by an impact, it will break and fly into fragments of varying sizes and if broken in the vicinity of a person is quite apt to cause injury to such person. Safety glass is designed to prevent the scattering or flying of the glass, and this is accomplished by bonding the glass sheets to the intermediate layer, with the thought in mind that should the sheet become broken, the fragments will remain adherent to the plastic layer.

The effectiveness of the safety glass is dependent, among other things, upon the quality of bond between the various laminations. Properly made safety glass will ordinarily not release sizeable particles of glass. However, even though the glass sheets are bonded to the plastic material, when broken the glass sheets break into particles of varying sizes and shapes. When impacted sufficiently hard, some of the glass may be thrown from the plastic or an entire portion of the laminated structure may be separated from the balance of the sheet and hurled against the occupants in the vehicle in which the glass may be used.

It is an important object of the present invention to provide an entirely new type of composite safety glass in which the glass sheets are so treated that when broken they will crack into relatively very small pieces and fairly uniform in size, with the central layer of plastic retaining the individual fragments. That is, glass sheets are used which have been tempered or hardened in a manner that each glass sheet will have its outer surfaces under compression and its interior under tension, and two of such sheets of tempered or hardened glass are bonded to a layer of plastic material.

Such composite glass is much more resistant to breakage than safety glass made from ordinary plate or window glass. However, when impacted sufficiently hard to cause actual breaking of the glass sheets, they will crack throughout their entire area into very small fragments of glass, the majority, if not all, of which fragments will remain adherent to the interposed layer of plastic. Consequently, even though some particles of glass are released from the composite structure, they will not be of sufficient size or of such shape as to cause serious injury to persons in proximity to the sheet when it is broken.

Other objects and advantages of the invention will become more apparent during the course of the following description when taken in connection with the accompanying drawings.

Figure 6:
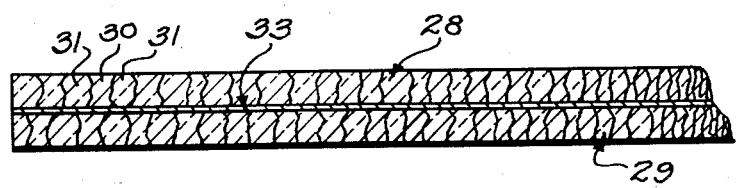

In the drawings wherein like numerals are employed to designate like parts throughout the same, Fig. 1 is a diagrammatic vertical sectional view through a form of apparatus that may be used in applying the bonding material to the laminations, Fig. 2 is a fragmentary sectional view showing the treated laminations in proper superimposed relationship, Fig. 3 discloses diagrammatically a form of pressing means that can be used in the making of the composite structure, Fig. 4 is a fragmentary sectional view showing diagrammatically a sheet of finished glass made in accordance with this invention, Fig. 5 is a fragmentary plan view showing a piece of glass, made in accordance with the present invention, after it has been broken, the drawing having been made to scale as nearly as possible from an actual piece of broken glass, and Fig. 6 is a fragmentary vertical sectional view through the piece of glass shown in Fig. 5.

The present invention is not limited to any particular process of assembling or pressing of the laminations or to any particular bonding material employed.

By way of example, it is pointed out that the composite safety glass may be made by passing a sheet of glass 10, which will be described more in detail hereinafter, over the rolls 11 and under the coating roll 12. The coating roll 12 is supplied with a film 13 of bonding material. As is shown, the hopper 14 contains a quantity of bonding material 15 which flows through the adjustable discharge spout 16 into the pocket formed between rolls 17 and 18. In the particular apparatus illustrated, the roll 17 is metal, while the rolls 12 and 18 are resilient rubber rolls. By properly adjusting the rolls 12, 17 and 18 with respect to one another, it is possible to deposit a substantially uniform film 19 of bonding material upon the glass sheet 10 passing between the rolls 12 and 20.

As is shown in Fig. 2, a layer of plastic material 21 is arranged between the coated glass sheets 22 and 23, the coatings being designated by the numeral 24. It will be understood that in the particular process being explained, the coatings 24 were formed with the apparatus illustrated in Fig. 1. For the purposes of illustration, the laminations have been shown in spaced relation, while in actual practice the laminations are laid one upon the other.

Ordinarily a cellulose ester is used as the non-brittle portion of the safety glass and such cellulose esters as pyroxylin plastic and cellulose acetate have been used satisfactorily. Various forms of adhesives, solvents, and other mediums can be used as the bonding material between the glass and plastic.

After assembling of the laminations, they may be pressed together in any desired manner. An ordinary platen press 25 is shown in Fig. 3, and the sandwich 26 is placed between the platens thereof and there subjected to the combined action of heat and pressure. If the platen type of press is employed, it is preferable to use cushioning means such as blotting paper, rubber sheets, or the like between the glass and platens.

In lieu of the platen press used, the glass can be passed through rollers or preliminarily pressed, and then finally pressed in an autoclave.

In Fig. 4 is illustrated diagrammatically a finished sheet 26, and to protect the marginal portions of the plastic and also the bond between the laminations, a weather-proofing seal 27 is shown.

In accordance with the present invention, the glass sheets, before being laminated, are tempered or hardened in any one of several different ways. For example, ordinary plate or window glass can be heated and in some processes the glass is heated to just about the softening point thereof. After proper heating of the glass, it is suddenly chilled to place the outer layers or surfaces of the glass sheets under compression and the interior thereof under tension.

The chilling of the glass can be accomplished between cold metal surfaces, by plunging in a bath of liquid or by directing blasts of air against the surfaces.

To prevent warping or buckling of the sheet during the tempering process, it is preferable that it be held in a vertical position during the heating and cooling steps. For example, the glass may be suspended vertically by suitable holding means arranged near the upper edge thereof, heated, and then transferred to a cooling chamber while still maintaining the sheet in vertical position. Due to the natural weight of the sheet when held in a vertical position, it will not have a tendency to become distorted or buckled.

Glass hardened or tempered in this manner cannot be subsequently cut and therefore the glass sheets should be cut to exact size and provided with the desired surface and edges before treatment, because it is characteristic of this type of glass that it cannot, after treatment, be altered in shape or size. Obviously, therefore, it is important that the two glass sheets used in the composite structure be accurately sized and carefully positioned during the laminating process. Any suitable forms of jigs or other aligning means can be employed during the assembling operations so that there will be no relative movement between the laminations during the compositing operation.

Composite safety glass has been made in accordance with the above, and it has been found that such glass is exceptionally resistant to breakage when compared to the relative ease with which ordinary glass is broken.

In Figs. 5 and 6 of the drawings is illustrated the character of break which results when glass made as described is broken. Figs. 5 and 6 were both made as accurately as possible to scale from actual glass made and broken. It will be noted that the glass sheets 28 and 29 are shown as having been broken into a large number of relatively very small particles of glass and that in breaking the glass cracks transversely, that is, from surface to surface. By inspecting Fig. 5, it can be seen that no particle of glass has a greater diameter than one-half inch and the majority of the particles have a diameter less than one-quarter inch. Also, it seems characteristic of the glass that it breaks in such a way that the particles are retained in interlocking relationship. For example, in Fig. 6, the particle 30 acts as a key between the adjacent particles 31 and 32. By reason of the fact that the glass sheets break from surface to surface, the individual particles remain adherent to the inner layer 33.

Even though some of the particles of glass should fly from the composite structure when broken, it will be appreciated that the size and shape of the particles are such that the particles would in all probability not cause any serious injury to a person struck thereby. Attention is also directed to the fact that the fragments of glass are not sharp and jagged.

The hardening or tempering of the glass sheets does not spoil the transparency of the glass and as a matter of fact, the ordinary person could not tell by mere inspection that the glass had been so treated.

I claim:

1. A composite safety glass sheet comprising a central layer of plastic material faced on both sides with adherent sheets of glass, each of said sheets of glass having its outer surface under compression and its interior under tension.

2. A composite safety glass sheet comprising two sheets of hardened glass and an interposed cellulose ester layer bonded thereto, the characteristics of the glass being such that when broken the glass sheet will crack throughout its area into a large number of small fragments which will remain adherent to the cellulose ester layer.

3. A composite safety glass sheet comprising two sheets of glass and an interposed cellulose ester layer bonded thereto, each sheet of glass, before bonding to the cellulose ester layer, being heated and then suddenly chilled so that after bonding, and if broken, it will crack transversely thereof into a large number of small particles which will remain adherent to the cellulose ester layer.

4. A composite safety glass sheet comprising two sheets of glass and an interposed non-brittle layer bonded thereto, the glass sheets before bonding being treated so that after lamination and upon breakage thereof, the glass will break into fragments, the greater majority of which will not exceed one-half inch in diameter.

5. A composite safety glass sheet comprising two sheets of glass and an interposed non-brittle layer bonded thereto, the glass sheets before bonding being treated so that after lamination and upon breakage thereof, the glass sheets will break transversely from surface to surface into a large number of fragments, the characteristic of transverse break being such that the fragments will be held substantially in interlocking relationship and adherent to the non-brittle layer.

6. A composite safety glass sheet comprising two sheets of glass and an interposed non-brittle layer bonded thereto, the glass sheets before bonding being treated so that after lamination and upon breakage thereof, the glass sheets will break transversely from surface to surface into small fragments, the greater majority of which will not exceed one-half inch in diameter.

7. A composite safety glass sheet comprising two sheets of glass and an interposed non-brittle layer bonded thereto, the glass sheets before bonding being treated so that after lamination and upon breakage thereof, the glass sheets will break transversely from surface to surface into small fragments, the greater majority of which will not exceed one-half inch in diameter, the shape of the fragments being such that they will be held in substantially interlocking relationship.

8. The process of producing composite safety glass, consisting in treating glass sheets in a manner to place their outer surfaces under compression and their interiors under tension, arranging a layer of plastic material between two of such sheets of glass, said glass sheets and layer of plastic material being properly treated with a bonding material, and then subjecting the sandwich thus formed to the action of heat and pressure to produce a composite structure.

9. The process of producing composite safety glass, consisting in treating glass sheets in a manner that upon breakage, each sheet will break transversely thereof from surface to surface into a large number of small particles, the majority of which will not exceed one-half inch in diameter, then arranging a layer of plastic material between two of such sheets of glass, said glass sheets and layer of plastic material being properly treated with a bonding material, and then subjecting the sandwich thus formed to the action of heat and pressure to produce a composite structure.

WILLIAM J. BELKNAP.